United States Patent [19]

Mori et al.

[11] Patent Number: 4,642,495
[45] Date of Patent: Feb. 10, 1987

[54] ELECTRIC ROTARY MACHINE HAVING SUPERCONDUCTING ROTOR

[75] Inventors: Takanobu Mori; Yutaka Fukui; Tetsuo Kashimura, all of Hitachi; Yoshimi Yanai, Kitaibaraki, all of Japan

[73] Assignee: Hitachi, Ltd., Tokyo, Japan

[21] Appl. No.: 726,394

[22] Filed: Apr. 23, 1985

Related U.S. Application Data

[63] Continuation of Ser. No. 467,808, Feb. 18, 1983, abandoned.

[30] Foreign Application Priority Data

Feb. 19, 1982 [JP] Japan .................................. 57-24488

[51] Int. Cl.$^4$ .............................................. H02K 9/00
[52] U.S. Cl. ...................... 310/52; 148/409; 420/457
[58] Field of Search ................ 310/52, 10; 420/457; 148/409

[56] References Cited

U.S. PATENT DOCUMENTS

| | | | |
|---|---|---|---|
| 1,755,555 | 4/1930 | Mudge | 148/409 |
| 2,234,955 | 3/1941 | Bieber et al. | 148/409 |
| 3,578,440 | 5/1971 | Eiselstein et al. | 148/409 |
| 4,039,870 | 8/1977 | Sterrett | 310/52 |
| 4,171,494 | 10/1979 | Yamaguchi et al. | 310/52 |

FOREIGN PATENT DOCUMENTS 0867165 2/1953 Fed. Rep. of Germany ...... 420/457

OTHER PUBLICATIONS

Huntington Alloys; *Monel Alloys* International Nickel Co. Inc., pp. 31–53, 12/72.

*Primary Examiner*—Melvyn J. Andrews
*Assistant Examiner*—S. Kastler
*Attorney, Agent, or Firm*—Antonelli, Terry & Wands

[57] ABSTRACT

An electric rotary machine (for example, a dynamoelectric machine) having a superconducting rotor is disclosed in which an outer shielding member for protecting a superconducting field winding from the influence of the magnetic flux from the stator side and for interrupting heat radiated from the normal temperature side is made of a nickel alloy containing not more than 0.3% carbon, not more than 1% silicon, not more than 2% manganese, not more than 1.5% titanium, from 2 to 8% aluminum, from 8 to 40% copper, and not less than 55% nickel for the balance by weight. The nickel alloy has a structure that a $\gamma'$-phase precipitation is formed by aging in an austenitic matrix, and is non-magnetic at 20° C.

9 Claims, 5 Drawing Figures

ELECTRIC ROTARY MACHINE HAVING SUPERCONDUCTING ROTOR

This is a continuation of application Ser. No. 467,808, filed Feb. 18, 1983 now abandoned.

The present invention relates to electric rotary machines such as dynamoelectric machines, and more particularly to an electromagnetic shielding body of the normal temperature used in a superconducting generator.

In general, a superconducting rotor is used in a superconducting condition in which a field winding is kept at an extremely low temperature less than 20° K. so that the resistance of the winding may be greatly reduced. The electric rotary machines include an electric motor, a generator, and a rotary phase modifier.

The rotor of a resolving-field type superconducting generator, which is one of the superconducting generators, has a structure wherein multiplex hollow-cylinders are coaxially disposed one within another. In more detail, the rotor includes an outer electromagnetic shielding body, an inner electromagnetic shielding body (kept at a temperature which is about 50° C. higher than the temperature of liquefaction of helium), a superconducting coil cover, a superconducting coil bind, a superconducting coil, a torque tube for mounting thereon the superconducting coil, a helium path for cooling, a shaft, a current lead wire, liquid helium, and a liquid helium supply pipe arranged in the order described from the outside. When the rotor is rotated, the liquid helium is pressed against the inner wall of the torque tube by the centrifugal force, and thus has a cylindrical shape. The inside of the inner shielding body and that of the outer shielding body are kept at vacuum.

In a large-capacity superconducting generator, a current flowing through the armature winding changes when a fault or accident occurs in a power transmission system. In this case, if the rotor is not provided with the above-mentioned shielding bodies, a damping force is applied to the rotor due to the electromagnetic interaction between a magnetic flux generated by the armature winding and a field current. Thus, the rotational speed of the rotor is decreased, the rotor is put in an asynchronous state. When the rotor is put in the asynchronous state, the armature current changes more remarkably, and an excessive driving force and a damping force are alternately applied to the rotor. This results in the fatal damage to both of the power transmission system and generator.

The electromagnetic shielding bodies are used to prevent the rotor from being put in an asynchronous state, and to prevent a magnetic flux component caused by the change in the armature current from linking the armature and field windings. That is, the magnetic flux component is converted by the shielding bodies into eddy currents flowing therein, and thus the flux density inside the shielding bodies is attenuated. The magnetic flux generated by the armature winding has a frequency component of 120 Hz due to the rotation, and a low-frequency component of 0.5 to 2 Hz due to irregularities in rotation of the rotor. The former and latter components are cut off by the outer and inner electromagnetic shielding bodies, respectively. At this time, owing to the interaction between the magnetic flux generated by the armature winding and the eddy current flowing in the outer shielding body, a rotational damping force by the irregularities in rotation and a strong electromagnetic force are applied to the outer shielding body.

Accordingly, a material for making the outer shielding body is required to be excellent in conductivity and high in mechanical strength, and further required to be non-magnetic for the following reason. Surely, a very high flux density can be obtained by the superconducting coil. However, when a ferromagnetic material is interposed between the superconducting coil and armature winding, an available magnetic flux is reduced due to the magnetic saturation of the ferromagnetic material.

It has been proposed that the outer shielding body is formed in a two-layer structure in which a non-magnetic copper alloy having a large conductivity and a non-magnetic steel having a high mechanical strength are joined together by explosive bonding in the prior art publications of U.S. Pat. Nos. 4,039,870 and 4,171,494. In the shielding body formed in the two-layer structure, however, owing to the use of welding in the manufacturing process, exfoliation may occur between the two layers and a weld crack may be generated in a welded portion of the layers. Further, these defects may proceed in the course of rotation, and thus there is the danger of damage to the shielding body. Therefore, it is unfavorable from a practical point of view to use a composite structure and a welding technique in fabricating the outer shielding body.

Further, it has been known that precipitation hardening aluminum alloy and copper alloy are non-magnetic and have good conductivity at normal temperature. However, these alloys show a yield strength of 50 kg/mm$^2$ or less with a 0.2% offset at normal temperature, that is, the 0.2% proof stress of these alloys at normal temperature is equal to or less than 50 kg/mm$^2$. In a superconducting generator with a capacity of 50 MVA or more, the electromagnetic shielding body of normal temperature is required to have a 0.2% proof stress of 60 kg/mm$^2$ or more. Therefore, it is impossible to make the shielding body of aluminum alloys or copper alloys.

An object of the present invention is to provide an electric rotary machine having a superconducting rotor in which an outer electromagnetic shielding body included in the superconducting rotor can solve the above-mentioned problems of the prior art, and is ductile, non-magnetic, with good conductivity and high mechanical strength at normal temperature.

In order to attain the above object, according to the present invention, there is provided an electric rotary machine having a superconducting rotor, in which the superconducting rotor comprises a driving shaft having at an end thereof a flange portion, a hollow shaft confronting the driving shaft with a gap therebetween and having a flange portion, a torque tube connected between the flange portions, a field winding provided on an outer peripheral surface of the torque tube, a coolant pool formed in the torque tube, coolant supply means for supplying a coolant to the coolant pool through the hollow shaft, an inner shielding member formed of a cylindrical non-magnetic body and provided so as to surround the field winding, a cylindrical outer shielding member disposed so as to surround the inner shielding member and connected between the flange portions, coolant discharge means for collecting the coolant from the coolant pool through the hollow shaft, and a power lead passing through the hollow shaft for supplying the field winding with electric power, and in which the outer shielding member is made of a non-magnetic nickel alloy containing not more than 0.3% carbon, not more than 1% silicon, not more than 2% manganese, not more than 1.5% titanium, from 2 to 8% aluminum, from 8 to 40% copper, and not less than 55% nickel for the balance by weight, said alloy having such a structure that a γ'-phase precipitation is formed by aging in an austenitic matrix and is non-magnetic at 20° C.

According to the present invention, a member which is large in mechanical strength and low in resistivity, is used as the outer shielding member. Accordingly, the outer shielding member can withstand any centrifugal force and any electromagnetic force which may be generated in a large-sized electric rotary machine, and therefore the damage to or deformation of the shielding member due to an accident can be prevented.

The present invention will become apparent from the following detailed description taken in conjunction with the accompanying drawings, in which.

Figure 2:
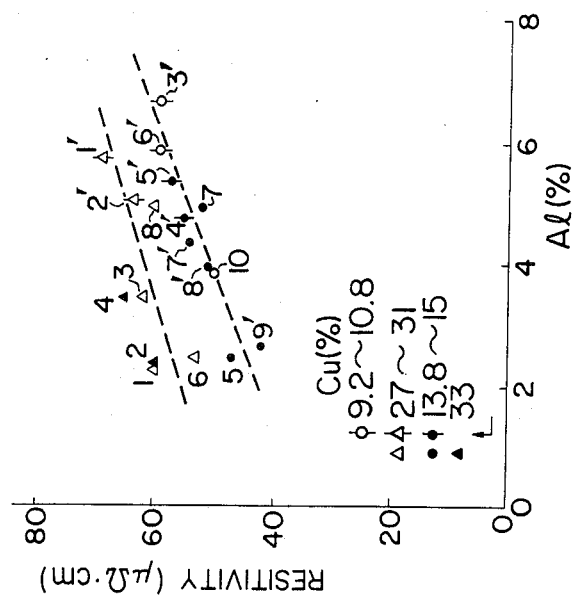
FIG. 2 is a graph showing the relation between aluminum content and resistivity at 20° C. for the alloys.

After the extensive investigation of nickel alloys, the present inventors have found the previously-mentioned novel nickel-copper alloy which is high in mechanical strength, large in electrical conductivity, and non-magnetic.

The Curie point of a nickel-copper binary alloy is low as the copper content thereof is larger, and the alloy is non-magnetic at normal temperature for a copper content exceeding 15%. Further, the resistivity of the alloy increases as the copper content is larger. Since the outer electromagnetic shielding body is kept at normal temperature, it is preferable that the outer shielding body has a resistivity of 70 $\mu\Omega$.cm or less at normal temperature. A nickel-copper alloy whose copper content is not more than 40%, has a resistivity of 70 $\mu\Omega$.cm or less.

The mechanical strength of nickel-copper binary alloy is generally low. In order to improve the mechanical strength of the alloy by precipitation hardening without increasing the resistivity thereof greatly, various elements have been added to the alloy. Of the elements, aluminum has produced the most excellent result. That is, when aging is carried out at a temperature of 450° to 650° C. for a nickel-copper alloy containing an appropriate amount of aluminum, an austenite structure containing a γ'-phase (of Ni$_3$Al type) is formed. Thus, the mechanical strength of the alloy is greatly increased. Further, the addition of aluminum is effective for lowering the Curie point of the alloy.

A nickel alloy suitable for use in an outer electromagnetic shielding body according to the present invention preferably contains from 0.05 to 0.25% carbon, from 0.01 to 0.5% silicon, from 0.01 to 1.5% manganese, from 2.5 to 6% aluminum, from 9.2 to 15% copper, and not less than 60% nickel for the balance by weight. Further, it is preferable that the above alloy contains from 0.1 to 0.6% titanium by weight.

The composition range of the nickel alloy for making an outer shielding body according to the present invention is limited as mentioned above, for the following reasons. Carbon is added to the alloy for the purpose of solution strengthening. However, when carbon is added too much, not only the resistivity of the alloy is increased, but also titanium carbide TiC is precipitated in the alloy. The precipitation of TiC deteriorates the machinability of the alloy. Accordingly, it is preferable that the carbon content of the alloy is not more than 0.3%. It is especially preferable that the carbon content lies in a range from 0.05 to 0.25%.

Silicon is added to the alloy as a deoxidizer in melting the alloy. It is desirable that the silicon content of the alloy is not less than 0.01%, but the silicon content is required to be not more than 1%. In order to obtain alloys to have a good hot-workability, high toughness and a large electrical conductivity, it is preferable that the silicon content be not more than 0.5%.

Manganese is added to the alloy as a deoxidizer and a desulfurizer in melting the alloy. It is desirable that the manganese content of the alloy is not less than 0.1%, but the manganese content is required to be not more than 2%. In order to maintain the high conductivity of the alloy, it is preferable that the manganese content is not more than 1.5%. It is especially preferable to put the manganese content in a range from 0.1 to 0.5%.

Aluminum produces a γ'-phase (of Ni$_3$Al type) in a matrix by aging to reinforce the alloy, and moreover lowers the Curie point of the alloy. It is necessary for the aluminum content of the alloy to be not less than 2%. However, when the aluminum content exceeds 8%, the hot-workability, toughness and electrical conductivity of the alloy are deteriorated. It is especially preferable that the aluminum content lies in a range from 2.5 to 6%.

Copper lowers the Curie point of the alloy without increasing the resistivity thereof greatly. It is necessary for the copper content is not less than 8%. However, when the copper content exceeds 40%, the conductivity and mechanical strength of the alloy are reduced. The copper content lies preferably in a range from 12 to 33%, and more preferably in a range from 9.2 to 15%.

Titanium produces titanium carbide in the alloy and reinforces the alloy remarkably. The titanium carbide does not only reinforce the alloy but also makes crystal grains small. Accordingly, the hot-workability and toughness of the alloy are greatly improved. Further, when a very small amount of titanium is added to the alloy, titanium acts as a very effective deoxidizer. The titanium content of the alloy is preferably put in a range from 0.1 to 0.6%.

In the present invention, it is preferred to use a nickel alloy substantially containing from 0.05 to 0.25% carbon, x% aluminum, y% copper, and the balance nickel, where the aluminum content x and copper content y lie within a composition range having as corners thereof a composition A (containing 2% aluminum and 12% copper), a composition H (containing 2.5% aluminum and 15% copper), a composition I (containing 8% aluminum and 15% copper), a composition E (containing 8% aluminum and 10% copper), a composition J (containing 7.3% aluminum and 9.2% copper), and a composition K (containing 3.7% aluminum and 9.2% copper). Thus, a nickle alloy can be obtained which is non-magnetic at 20° C. and has at 20° C. a proof stress of 60 kg/mm$^2$ or more and a resistivity of 70 $\mu\Omega$cm or less. It is preferable that the nickel alloy further contains from 0.01 to 0.5% silicon, from 0.01 to 0.5% manganese and from 0.1 to 0.6% titanium.

A cylindrical outer shielding member according to the present invention can be formed in various manners. For example, a hollow cylinder having a predetermined shape is made by casting, a ring is made by casting and then the ring is shaped into a hollow cylinder by forging, or a plate is first made by forging and then the plate is bent into a semi-cylindrical shape, the facing edges of which are joined together by welding to form a hollow-cylinder. The hollow-cylinder thus formed is subjected to a solution treatment, and then the γ'-phase is formed by aging to reinforce the cylinder. The alloy may be made by melting in air or vacuum. It is especially preferable that electroslag remelting is carried out for the above alloy.

The solution treatment is preferably carried out at a temperature of 800° to 950° C., and the aging is preferably performed at temperatures between 450° C. and 650° C. The aging is carried out at a plurality of stages. For example, first, second and third age treatments are performed at a temperature of 550° to 650° C., a temperature of 500° to 600° C., and a temperature of 450° to 550° C., respectively. The mechanical strength of the cylinder is large and the aging time is short, as the number of age treatments is larger.

As is apparent from the foregoing description, an outer shielding member according to the present invention is not formed into a conventional two-layer structure, but formed into a single alloy layer.

EMBODIMENT 1

Nickel alloys having carbon, silicon, manganese, titanium, aluminum, copper and nickel contents (in weight %) shown in the following Table 1 were made by vacuum melting, and then a plate having a thickness of 15 mm was made of each of the alloys by hot rolling at 750°–1100° C. The plate was kept at 850° C. for a half hour and immediately thereafter cooled in water, to be subjected to a solution treatment. Then, the plate was placed in a furnace, to be kept at 620° C. for two hours and then cooled in the furnace. Subsequently, the plate was kept at 565° C. for four hours and then cooled in the furnace. Further, the plate was kept at 510° C. for four hours, and then cooled in air. Thus, aging was carried out for the plate. The Curie point, resistivity at normal temperature, and 0.2% proof stress at normal temperature (namely, a yield strength producing a 0.2% permanent elongation at normal temperature) were measured for each plate. The results of measurements are also shown in the following Table 1.

TABLE 1

| Sample No. | C | Si | Mn | Ti | Al | Cu | Ni | Curie point (°C.) | Resistivity ($\mu\Omega \cdot$ cm) | 0.2% proof stress (kg/mm$^2$) |
|---|---|---|---|---|---|---|---|---|---|---|
| 1 | 0.15 | 0.2 | 0.2 | 0.4 | 2.3 | 27.0 | 69.75 | −80 | 60 | 60 |
| 2 | 0.15 | 0.2 | 0.2 | 0.4 | 2.3 | 33.0 | 63.75 | −90 | 60 | 60 |
| 3 | 0.15 | 0.2 | 0.2 | 0.4 | 3.5 | 27.0 | 68.55 | −105 | 62 | 75 |
| 4 | 0.15 | 0.2 | 0.2 | 0.4 | 3.5 | 33.0 | 62.55 | −90 | 63 | 70 |
| 5 | 0.15 | 0.2 | 0.2 | 0.4 | 2.5 | 15.0 | 81.55 | 0 | 47 | 64 |
| 6 | 0.15 | 0.2 | 0.2 | 0.4 | 2.5 | 27.0 | 69.55 | −90 | 53 | 63 |
| 7 | 0.15 | 0.2 | 0.2 | 0.4 | 5.0 | 15.0 | 79.05 | −30 | 52 | 87 |
| 8 | 0.15 | 0.2 | 0.2 | 0.4 | 5.0 | 27.0 | 67.05 | −100 | 60 | 80 |

Further, nickel alloys having carbon, silicon, manganese, titanium, aluminum, copper and nickel contents (in weight %) shown in the following Table 2 were made by vacuum melting, and then a plate having a thickness of 15 mm was made of each of these alloys by hot forging at a temperature of 750° to 1100° C. The plate was kept at a temperature of 800° to 900° C. for one hour and immediately thereafter cooled in water, to be subjected to a solution treatment. Then, the plate was placed in a furnace, to be kept at 590° C. for 16 hours and then cooled in the furnace. Subsequently, the plate was kept at 540° C. for six hours, and then cooled in the furnace. Further, the plate was kept at 480° C. for six hours, and then cooled in air. Thus, aging was carried out for the plate. The Curie point, resistivity at normal temperature and 0.2% proof stress at normal temperature were measured for each plate. The results of measurements are also shown in the following Table 2.

TABLE 2

| Sample No. | C | Si | Mn | Ti | Al | Cu | Ni | Curie point (°C.) | Resistivity ($\mu\Omega \cdot$ cm) | 0.2% Proof stress (kg/mm$^2$) |
|---|---|---|---|---|---|---|---|---|---|---|
| 1' | 0.01 | 0.2 | 0.2 | 0.4 | 5.8 | 31.2 | 62.19 | <−196 | 68.7 | 115 |
| 2' | 0.01 | 0.2 | 0.2 | 0.4 | 5.1 | 27.7 | 66.39 | <−196 | 63.5 | 106 |
| 3' | 0.01 | 0.2 | 0.2 | 0.5 | 6.7 | 9.2 | 83.19 | −5 | 59.2 | 103 |
| 4' | 0.01 | 0.2 | 0.2 | 0.4 | 4.8 | 13.8 | 80.59 | −70 | 55.2 | 62 |
| 5' | 0.01 | 0.2 | 0.2 | 0.4 | 5.4 | 13.5 | 80.29 | −80 | 57.2 | 97 |
| 6' | 0.01 | 0.2 | 0.2 | 0.4 | 5.9 | 10.8 | 82.49 | −60 | 59.0 | 105 |
| 7' | 0.15 | 0.2 | 0.2 | 0.4 | 4.4 | 14.8 | 79.85 | −30 | 53.8 | 82 |
| 8' | 0.15 | 0.2 | 0.2 | 0.4 | 4.0 | 14.3 | 80.75 | −20 | 51.0 | 64 |
| 9' | 0.16 | 0.2 | 0.2 | 1.2 | 2.7 | 13.8 | 81.74 | −5 | 42.1 | 61 |
| 10' | 0.15 | 0.2 | 0.2 | 0.8 | 3.9 | 10.4 | 84.35 | −10 | 50.3 | 63 |

Figure 1:
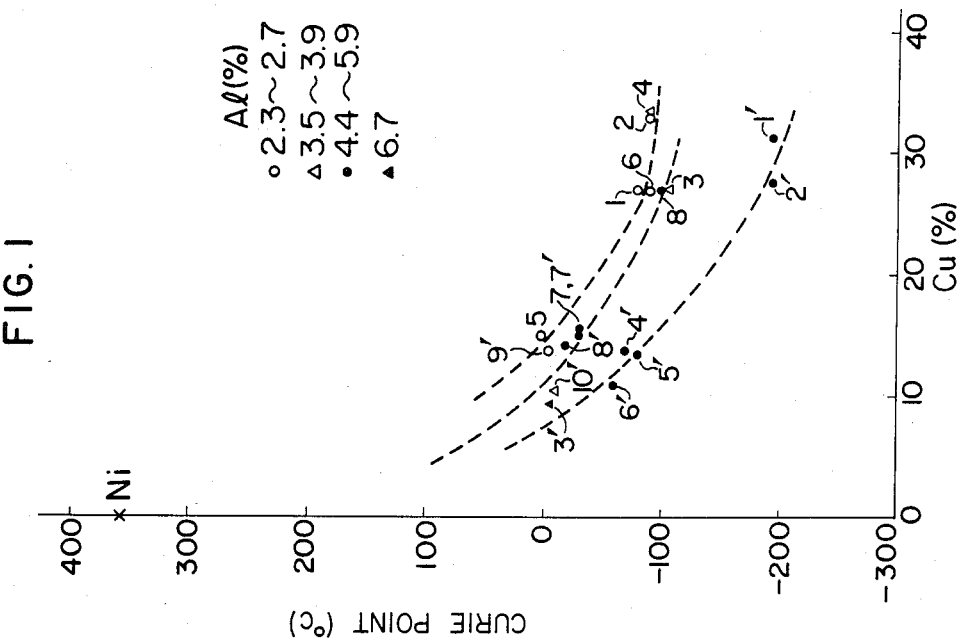
FIG. 1 is a graph showing the relation between copper content and Curie point for alloys according to the present invention.

FIG. 1 is a graph showing the relation between copper content and Curie point for the alloys listed in the Tables 1 and 2. Numerals in FIG. 1 designate sample number. As is apparent from FIG. 1, the Curie point of the alloys is low as each of copper and aluminum contents is larger.

FIG. 2 is a graph showing the relation between aluminum content and resistivity for the alloys listed in the Tables 1 and 2. Numerals in FIG. 2 designate the sample number. As can be seen from FIG. 2, the resistivity of the alloys increases as each of aluminum and copper contents is larger.

Figure 3:
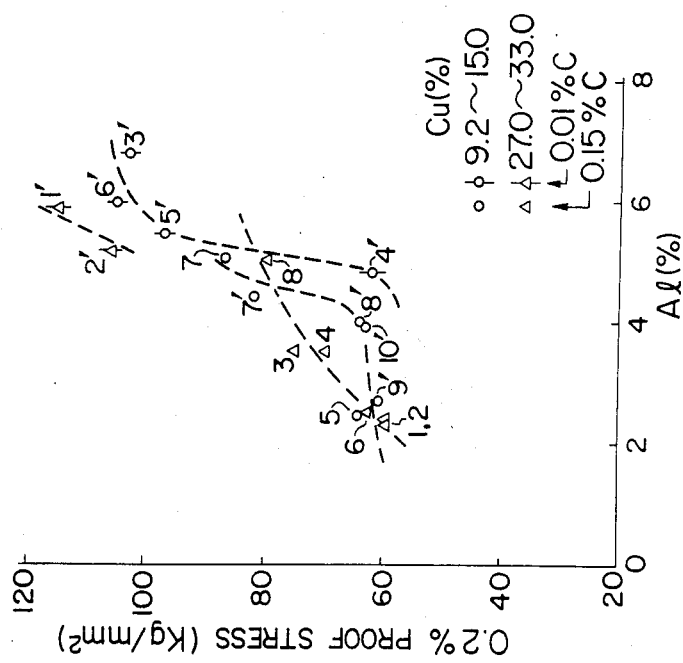
FIG. 3 is a graph showing the relation between aluminum content and 0.2% proof stress at 20° C. for the alloys.

FIG. 3 is a graph showing the relation between aluminum content and 0.2% proof stress, for the alloys listed in the Tables 1 and 2. Numerals in FIG. 3 designate the sample number. It is known from FIG. 3 that the above-mentioned 0.2% proof stress increases rapidly with increasing aluminum content and is not always affected by an increase in copper content.

Figure 4:
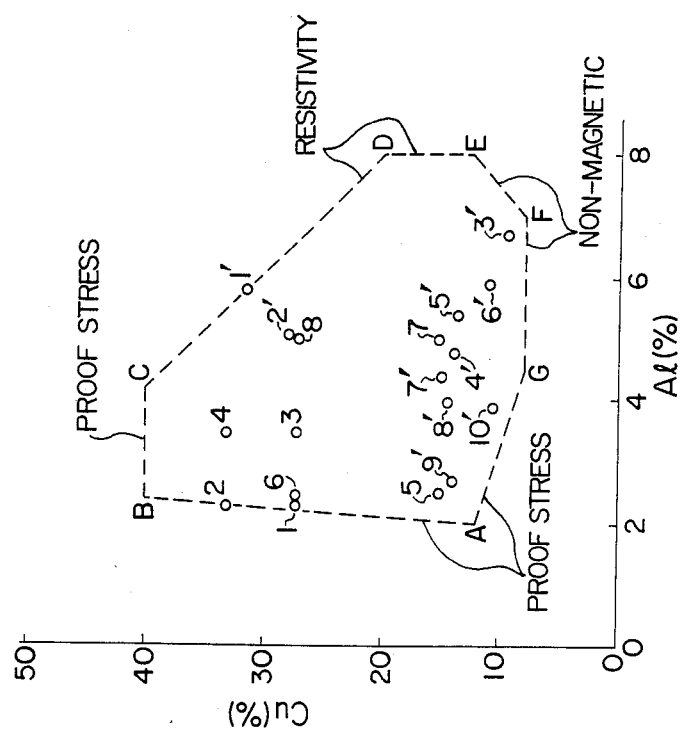
FIG. 4 is a graph showing the relation between aluminum content and copper content for the alloys.

FIG. 4 is a graph showing a range of aluminum and copper contents in which a nickel alloy is non-magnetic at 20° C. and has at 20° C. a 0.2% proof stress of 60 kg/mm$^2$ or more and a resistivity of 70 $\mu\Omega$.cm or less. The above range was determined on the basis of the data shown in the Tables 1 and 2. Referring to FIG. 4, a straight line connecting points A and B, a straight line connecting points B and C, and a straight line connecting points G and A are drawn on the basis of the points A, B, C and G each having a proof stress of 60 kg/mm$^2$. A straight line connecting points C and D and a straight line connecting points D and E are drawn on the basis of the points C, D and E each having a resistivity of 70 $\mu\Omega$.cm. Further, a straight line connecting points E and F and a straight line connecting points F and G are drawn on the basis of the points E, F and G each corresponding to a non-magnetic alloy. In FIG. 4, the points A, B, C, D, E, F and G indicate a composition containing 2% Al and 12% Cu, a composition containing 2.5% Al and 40% Cu, a composition containing 4.2% Al and 40% Cu, a composition containing 8% Al and 20% Cu, a composition containing 8% Al and 10% Cu, a composition containing 7% Al and 8% Cu, and a composition 4.5% Al and 8% Cu, respectively.

EMBODIMENT 2

10 kg of a nickel alloy having carbon, silicon, manganese, aluminum, titanium, copper and nickel contents (in weight %) shown in a Table 3 was made by vacuum melting, and then a rod having a diameter of 30 mm was made of the alloy by hot forging. Subsequently, electroslag remelting was carried out by using the rod as an electrode, and thus an ingot having a diameter of 60 mm and a length of 230 mm was obtained. A flux made by adding 2% TiO$_2$ to a mixture containing 40% CaF$_2$, 30% CaO and 30% Al$_2$O$_3$ was used in the electroslag remelting. Further, the remelting was carried out at a current of 850 to 925 A, a voltage of 30 to 34 V and a melting rate of 439 g/min. The ingot was shaped into a rod having a diameter of 30 mm by hot forging at the temperature of 750° C. to 1100° C. The rod thus formed was kept at 900° C. for a half hour and immediately thereafter cooled in water, to be subjected to a solution treatment. Then, the rod was placed in a furnace, to be kept at 620° C. for two hours and then cooled in the furnace. Subsequently, the rod was kept at 565° C. for four hours and then cooled in the furnace. Further, the rod was kept at 510° C. for four hours and then cooled in air. Thus, aging was carried out for the rod.

The nickel alloy thus treated had a Curie point of −52° C., a resistivity of 53 $\mu\Omega$.cm and a 0.2% proof stress of 78 kg/mm$^2$, and therefore had all of characteristics required for an electromagnetic shielding body which was provided in a superconducting generator. Further, according to the electroslag remelting in the present embodiment, not only a refined alloy is obtained but also a large hollow ingot can be formed. That is, an electromagnetic shielding body of normal temperature included in a superconducting generator having a capacity of 50 MVA or more, can be formed as a unitary forged body.

TABLE 3

| C | Si | Mn | Al | Ti | Cu | Ni |
| --- | --- | --- | --- | --- | --- | --- |
| 0.15 | 0.2 | 0.2 | 4.3 | 0.4 | 20.7 | Balance |

EMBODIMENT 3

10 kg of a nickel alloy having carbon, silicon, manganese, aluminum, titanium, copper and nickel contents (in weight %) shown in a Table 4 was made by vacuum melting, and then a rod having a diameter of 30 mm was made of the alloy by hot forging. Subsequently, electroslag remelting was performed by using the rod as an electrode, and thus an ingot having a diameter of 60 mm and a length of 230 mm was obtained. The same flux as in EMBODIMENT 2 was used in the electroslag remelting. Furhter, the remelting was carried out at a current of 750 to 800 A, a voltage of 25 to 27 V, and a melting rate of 320 g/min. The ingot was shaped into a rod having a diameter of 15 mm by hot forging at a temperature 750° to 1100° C. The rod thus formed was kept at 900° C. for one hour and immediately therefore cooled in water, to be subjected to a solution treatment. Then, the rod was placed in a furnace, to be kept at 590° C. for 16 hours and then cooled in the furnace. Further, the rod was kept at 540° C. for six hours, and then cooled in the furnace. Subsequently, the rod was kept at 480° C. for six hours, and then cooled in air. Thus, aging was carried out for the rod.

The nickel alloy thus treated had a Curie point of −20° C., a resistivity of 54 $\mu\Omega$.cm and a 0.2% proof stress of 80 kg/mm$^2$, and therefore had all of characteristics required for an electromagnetic shielding body which was provided in a superconducting generator. Furhter, according to the electroslag remelting in the present embodiment, not only a pure alloy is obtained but also a large hollow ingot can be formed. That is, an electromagnetic shielding body of normal temperature included in a superconducting generator having a capacity of 50 MVA or more can be formed as a unitary forged body.

TABLE 4

| C | Si | Mn | Al | Ti | Cu | Ni |
| --- | --- | --- | --- | --- | --- | --- |
| 0.15 | 0.2 | 0.2 | 4.2 | 0.4 | 14.6 | Balance |

As has been explained in the above-mentioned, according to the present invention, an outer shielding body can be made of a nickel alloy which is excellent in all of the magnetic property, electric conductivity and mechanical strength.

EMBODIMENT 4

Figure 5:
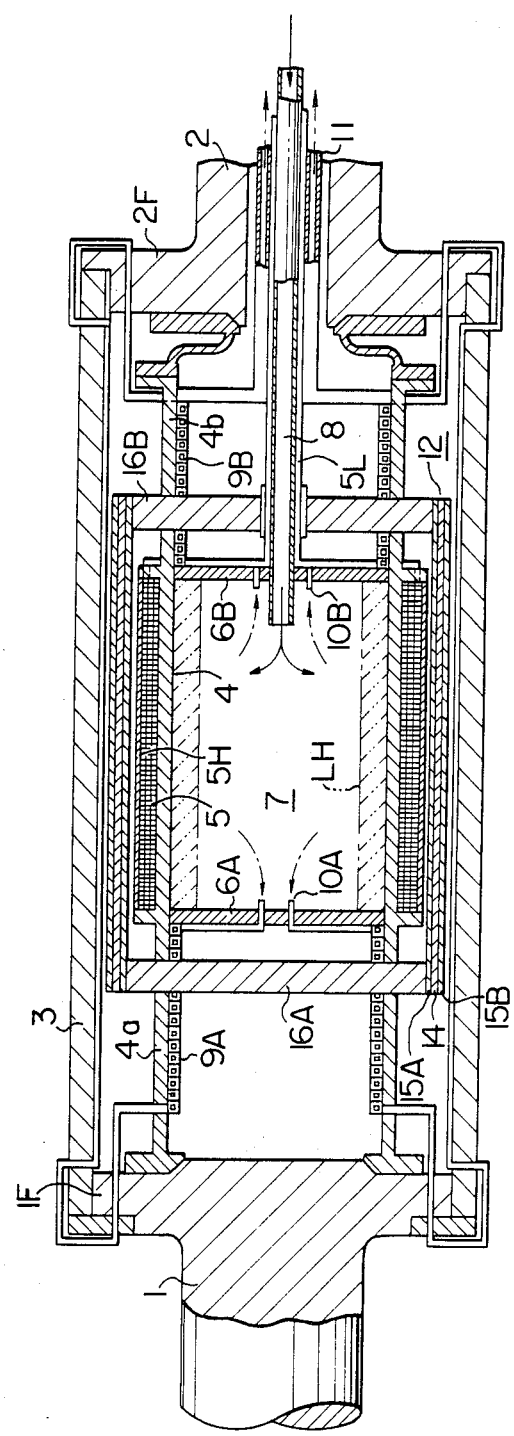
FIG. 5 is a sectional view showing an embodiment of a superconducting rotor according to the present invention.

FIG. 5 shows, in section, a superconducting rotor of an A.C. generator. Roughly speaking, the superconducting rotor is made up of a rotor shaft, a field winding 5, and a coolant circulation path for maintaining the field winding 5 at an extremely low-temperature below 20° K. The rotor shaft is of a split type, and includes a driving shaft 1 connected to a prime mover such as a gas turbine, a steam turbine or a water turbine for transmitting a driving torque and a hollow-shaft 2 for passing therethrough the coolant circulation path and a power lead explained later. These shafts 1 and 2 have respective flanges 1F and 2F at their facing ends, and confront each other with a predetermined distance therebetween. A cylindrical outer shielding member 3 bridges the flanges 1F and 2F and are fixed thereto, to unite the shafts 1 and 2 to one body. A torque tube 4 is disposed inside the outer shielding member 3 concentrically therewith, and also bridges the flanges 1F and 2F. The field winding 5 is disposed on the outside of the torque tube 4 to transmit a torque from the driving shaft 1. The outer peripheral surface of the field winding 5 is held by a non-magnetic holding sleeve 5H. A power lead 5L passing through the hollow shaft 2 is connected to the field winding 5, to supply thereto an electric power from an external power source. The torque tube 4 forms a coolant pool 7 having substantially the same axial length as the field winding 5, together with partitions 6A and 6B. A coolant supply pipe 8 passing through the hollow shaft 2 is extended into the coolant pool 7 so that an open end of the pipe 8 is placed in an axial portion of the coolant pool 7. Inlet ports 10A and 10B of cooling ducts 9A and 9B are provided in central portions of the partitions 6A and 6B defining the coolant pool 7. The cooling ducts 9A and 9B are disposed at both end portions 4a and 4b of the torque tube 4 along the inner periphery thereof. The cooling duct 9A further extends continuously along the inner peripheral surface of the outer shielding member 3, and is connected to a coolant discharge pipe 11, together with the other cooling duct 9B. The coolant discharge pipe 11 extends through the hollow shaft 2 to the outside of the rotor. The rotor shaft, field winding, and coolant circulation path are arranged as mentioned above.

In addition to the above-mentioned fundamental arrangement of the superconducting rotor, a cylindrical inner shielding member 12 is provided around the field winding 5, in order to protect the field winding 5 from the influence of the magnetic flux from the stator side and to maintain the field winding at an extremely low temperature without being affected by the heat radiation from the stator side. To protect the field winding 5, the inner shielding member 12 includes an inner shielding body 14 disposed within an annular space between the field winding 5 and outer shielding member 3 coaxially with these members 3 and 5, and inner and outer cylindrical reinforcing bodies 15A and 15B closely fitted to the inner and outer peripheral surfaces of the inner shielding body 14. The inner shielding body 14 and the inner and outer reinforcing bodies 15A and 15B are supported by end portions 4a and 4b of the torque tube 4 through supporting end plates 16A and 16B.

According to the present invention, a hollow cylinder which is made of one of the nickel alloys mentioned in EMBODIMENTS 1 to 3 and has a single layer structure, is used as the outer shielding member 3 of the superconducting rotor, after having been subjected to solution and age treatments.

Though not shown in the drawings, the driving shaft 1 and hollow shaft 2 are rotatably supported by means of bearings, and a stator made up of a stator core and a stator winding in the slot formed in the core is disposed around the outer shielding member 3 with an appropriate air gap therebetween.

Next, explanation will be made of the way for putting the field winding 5 into a superconducting state.

First, liquid helium is fed into the coolant pool 7 as indicated by solid lines with arrows, through the coolant supply pipe 8. In this state, the rotor is rotated. Owing to the resulting centrifugal force, liquid helium LH is spread over the entire inner peripheral surface of a central portion of the torque tube 4 corresponding to the field winding 5, as indicated by double-dotted chain lines. Consequently, the field winding 5 is cooled from the inner side of the torque tube 4, and helium boiled and vapourized through cooling is allowed to float in a central portion of the coolant pool 7. Actually, the torque tube 4 is provided with a number of small bores reaching the field winding 5, to allow the liquid helium LH in the coolant pool 7 to get into and out of the bores due to the convection in the field of centrifugal force, thereby cooling the field winding 5 to an extremely low temperature.

The gaseous helium floating in the central portion of the coolant pool 7 is introduced into the cooling ducts 9A and 9B from the inlet ports 10A and 10B, as indicated by single-dotted chain lines with arrows, to cool the end portions 4a and 4b of the torque tube 4 and the outer shielding member 3. The gaseous helium is then discharged to the outside of the rotor through the coolant discharge pipe 11, to be suitably collected. By feeding the liquid helium and circulating gaseous helium in the above-mentioned manner, the field winding 5 is kept at the extremely low-temperature, and the heat conduction to the field winding through the driving shaft 1, hollow shaft 2 and torque tube 4 is interrupted. The inside of the outer shielding member 3 is kept at vacuum, and the heat radiated from the stator side is insulated by the inner shielding body 14.

Further, the coolant supply pipe 8, coolant discharge pipe 11 and power lead 5L pass through the hollow shaft 2, to be connected with respective stationary parts on the outside of the rotor. More specifically, though not shown in the drawings, the coolant supply pipe 8 and coolant discharge pipe 11 are connected to the stationary parts through coolant supply and discharge means, while the power lead 5L is connected to the stationary part through a slip ring.

The field winding 5 is put in and kept at the superconducting state by feeding the liquid helium and circulating the gaseous helium in the above-mentioned manner, and then excited to start the generator.

We claim:

1. An electric rotary machine having a superconducting rotor, wherein said superconducting rotor comprises a driving shaft having at an end thereof a flange portion, a hollow shaft confronting said driving shaft with a gap therebetween and having a flange portion, a torque tube connected between said flange portions, a field winding provided on an outer peripheral surface of said torque tube, said torque tube having a coolant pool therein, coolant supply means for supplying a coolant to said coolant pool through said hollow shaft, an inner shielding member formed of a cylindrical non-magnetic body and provided so as to surround the field winding, a cylindrical outer shielding member disposed so as to surround the inner shielding member and connected between said flange portions, said outer shielding member being a cylindrical single-layer body, coolant discharge means for collecting said coolant from said coolant pool through said hollow shaft, and a power lead passing through said hollow shaft for supplying said field winding with electric power, and wherein said outer shielding member is made of a non-magnetic nickel alloy containing 0.05 to 0.25% carbon, 0.01 to 0.5% silicon, 0.01 to 0.5% manganese, 0.01 to 0.6% titanium, 2.5 to 6.0% aluminum, 9.2 to 15.0% copper, and the balance nickel by weight, said alloy having such a structure that a $\gamma'$-phase precipitation is formed by hard-aging in an austenitic matrix.

2. An electric rotary machine having a superconducting rotor as claimed in claim 1, wherein said outer shielding member has a resistivity of 70 $\mu\Omega$.cm or less and a 0.2% proof stress of 60 kg/mm$^2$ or more, at 20° C.

3. An electric rotary machine having a superconducting rotor as claimed in claim 1, wherein said cylindrical single-layer body is a body which has been made through electroslag remelting.

4. An electric rotary machine having a superconducting rotor as claimed in claim 1, wherein the alloy of the outer shielding member contains 4.2 to 5% aluminum.

5. An electric rotary machine having a superconducting rotor, wherein said superconducting rotor comprises a driving shaft having at an end thereof a flange portion, a hollow shaft confronting said driving shaft with a gap therebetween and having a flange portion, a torque tube connected between said flange portions, a field winding provided on an outer peripheral surface of said torque tube, said torque tube having a coolant pool, coolant supply means for supplying a coolant to said coolant pool through said hollow shaft, an inner shielding member formed of a cylindrical non-magnetic body and provided so as to surround the field winding, a cylindrical outer shielding member disposed so as to surround the inner shielding member and connected between said flange portions, said outer shielding member being a cylindrical single-layer body, coolant discharge means for collecting said coolant from said coolant pool through said hollow shaft, and a power lead passing through said hollow shaft for supplying said field winding with electric power, wherein said outer shielding member is made of a non-magnetic nickel alloy substantially containing 0.05 to 0.25% carbon, 0.01 to 0.5% silicon, 0.01 to 0.5% manganese, 0.1 to 0.6% titanium, x% aluminum, y% copper, and the balance nickel by weight, where said aluminum content x and copper content y lie in a composition range having as corners thereof a composition A (containing 2% aluminum and 12% copper), a composition B (containing 2.5% aluminum and 40% copper), a composition C (containing 4.2% aluminum and 40% copper), a composition D (containing 8% aluminum and 20% copper), a composition E (containing 8% aluminum and 10% copper), a composition F (containing 7% aluminum and 8% copper), and a composition G (containing 4.5% aluminum and 8% copper), said alloy having such structure that a $\gamma'$-phase precipitation is formed by aging in an austenitic matrix.

6. An electric rotary machine having a superconducting rotor as claimed in claim 5, wherein said cylindrical single-layer body is a body which has been made through electroslag remelting.

7. An electric rotary machine having a superconducting rotor as claimed in claim 5, wherein said outer shielding member has a resistivity of 70 $\mu\Omega$.cm or less and a proof stress of 60 kg/mm$^2$ or more, at 20° C.

8. An electric rotary machine having a superconducting rotor as claimed in claim 5, wherein said driving shaft is connected to a prime mover.

9. A generator having a superconducting rotor, wherein said superconducting rotor comprises a driving shaft having at an end thereof a flange portion and adapted to be connected to a prime mover, a hollow shaft confronting said driving shaft with a gap therebetween and having a flange portion confronting said flange portion of said driving shaft, a torque tube bridging a gap between said flange portions, a field winding supported on an outer peripheral surface of said torque tube, a non-magnetic holding sleeve adapted for holding the entire peripheral surface of said field winding, a coolant pool formed on the inner side of said torque tube, coolant supply means for supplying a coolant to said coolant pool through said hollow shaft, an inner shielding member disposed as to surround the field winding, supported by said torque tube, and made up of a cylindrical non-magnetic inner shielding body and non-magnetic reinforcing bodies closely fitted to inner and outer peripheral surfaces of said inner shielding body, a cylindrical outer shielding member disposed as to surround the inner shielding member and connected between said flange portions, said outer shielding member being a cylindrical single-layer body, cooling ducts starting from said cooling pool and extending along end portions of said torque tube and said outer shielding member, coolant discharge means for collecting said coolant from said cooling ducts through said hollow shaft, and a power lead passing through said hollow shaft for supplying said field winding with electric power, and wherein said outer shielding member is made of a non-magnetic nickel alloy containing 0.05 to 0.25% carbon, 0.01 to 0.5% silicon, 0.01 to 0.5% manganeses, 0.1 to 0.6% titanium, 2.5 to 6.0% aluminum, 9.2 to 15.0% copper, and the balance nickel by weight, said alloy having such a structure that a $\gamma'$-phase precipitation is formed by aging in an austenitic matrix.

* * * * *